United States Patent
Hall

(10) Patent No.: US 7,841,526 B2
(45) Date of Patent: Nov. 30, 2010

(54) SYSTEM AND METHOD FOR CORRELATING SUPPLY CHAIN THEFT WITH INTERNET AUCTION ACTIVITY

(75) Inventor: Stewart E. Hall, Wellington, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 12/176,821

(22) Filed: Jul. 21, 2008

(65) Prior Publication Data

US 2010/0012722 A1    Jan. 21, 2010

(51) Int. Cl.
*G06F 19/00* (2006.01)
(52) U.S. Cl. ............................................. 235/385
(58) Field of Classification Search .......... 235/385, 235/383; 705/10, 14.51, 14.52, 14.53, 14.54, 705/14.55, 15, 18, 22, 26
See application file for complete search history.

(56) References Cited

U.S. PATENT DOCUMENTS

| | | | | |
|---|---|---|---|---|
| 4,783,828 A | * | 11/1988 | Sadjadi | 382/170 |
| 5,828,405 A | * | 10/1998 | Vanier et al. | 348/61 |
| 6,449,611 B1 | * | 9/2002 | Frankel et al. | 707/6 |
| 7,420,465 B2 | * | 9/2008 | Ritter | 340/539.32 |
| 2008/0052184 A1 | * | 2/2008 | Junger et al. | 705/26 |

OTHER PUBLICATIONS

LaReeca Rucker; System to track stolen goods; Apr. 13, 2005; The Clarion-Ledger Miss. News (1 page).*

* cited by examiner

*Primary Examiner*—Seung H Lee
(74) *Attorney, Agent, or Firm*—Alan M. Weisberg; Christopher & Weisberg, P.A.

(57) ABSTRACT

A method, activity monitoring station and system automatically track lost or stolen items. The method begins by searching a sales activity database for at least one sales data record containing information for items sold or offered for sale on at least one Internet site, and searching a loss database for at least one loss data record containing information relating to lost or stolen items. The at least one sales data record is compared to the at least one loss data record to discover at least one matching item. If at least one matching item is discovered, a suspicious activity report is generated.

23 Claims, 3 Drawing Sheets

SYSTEM AND METHOD FOR CORRELATING SUPPLY CHAIN THEFT WITH INTERNET AUCTION ACTIVITY

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for correlating supply chain theft with Internet auction activity and more specifically to a method and system for tracking theft patterns and offers for sale on the Internet and correlating this with suspicious activities using a variety of predetermined indicators.

BACKGROUND OF THE INVENTION

Shoplifting and theft deterrence is an ongoing problem that has plagued the retail industry since its inception. In years past, thieves have had difficulty in selling stolen merchandise because there were very few available channels for reselling merchandise that both appealed to a mass audience and provided some degree of anonymity. However, with the growing popularity and accessibility of online auction sites and Internet advertising, thieves are now able to reach a broad, unsuspecting audience of consumers with stolen, pirated or gray market merchandise while remaining anonymous.

The situation has become even more difficult for retailers attempting to prevent loss from theft by implementing electronic article surveillance ("EAS") systems. The EAS systems generally include at least one detection terminal located near an exit point which use radio frequency signals to detect the tags attached to items of merchandise. When the active tag is brought within detection range of the terminal, an alarm is triggered. However, many shoplifters are not deterred by these EAS detection systems because retailers are unequipped to respond to the EAS alarms. Most retailers do not want to endanger employees by requiring them to chase down shoplifters who run out the door after setting off the alarm. Therefore, even with the implementation of EAS systems, many shoplifters still get away with stolen goods. When these "gate crashing" events occur, retailers do not even know which items were stolen until the inventory can be reconciled against sales records.

Radio-frequency identification ("RFID") systems provide a method for identification that use devices called RFID tags to remotely store and retrieve data. An RFID tag may be attached to or incorporated into a product and identifies the product through radio-frequency ("RF") waves. Most RFID tags contain an integrated circuit ("IC") and an antenna. The IC stores and processes information that can be used to identify the item the RFID tag is affixed to/associated with, and modulates and demodulates an RF signal. The antenna receives and transmits the RF signal. Chipless RFID technology allows for discrete identification of tags without using an integrated circuit, thereby allowing tags to be printed directly onto assets or RFID labels at a lower cost than traditional tags. Today, there is a widespread use of RFID systems in enterprise supply chain management for improving the efficiency of inventory tracking and management.

Law enforcement personnel have generally responded to online reselling of lost or stolen merchandise only when there is clear evidence that a crime has been committed. Only when law enforcement officials have compelling evidence will they seek the cooperation of online auction companies to obtain records of sales activity for prosecution or investigate other privately operated sales websites to determine if the operators are legitimate distributors or resellers of the products. In those instances, the law enforcement personnel, or more often the actual victims of these types of theft, are forced to manually search through records of sales to look for suspicious activity in the sales records of auction sites.

Various methods to identify thieves selling goods using on-line auction sites have been undertaken by the authorities, but these have been ineffective for a number of reasons. For one thing, it is difficult to discern stolen merchandise in the large volume of legitimate merchandise being sold "used" by previous owners or as "new-in-box" by distributors. Additionally, sellers can easily create an auction site with a new online ID using fake credentials and can quickly disappear after the sales are complete. When items are stolen from inventory or during shipping, the sales of the merchandise can often be completed before the retailer even realizes that the merchandise is missing. Sales via piracy or "grey market" channels usually go undetected because there is no easy way to monitor the Internet for the appearance of sites that offer pirated or grey market items for sale. Additionally, Internet sales are usually not local so there is no way to track where stolen goods were actually sent.

Therefore, what is needed is a system and method for tracking and correlating known losses from various points in the merchandise supply chain with items sold or offered for sale on Internet advertising and auction sites.

SUMMARY OF THE INVENTION

The present invention advantageously provides a method and system for identifying and tracking lost or stolen items. Generally, the present invention advantageously provides a database for collecting information about lost or stolen items at various points along a supply chain and correlating the loss information to items sold or offered for sale at known or new Internet sales sites.

One aspect of the present invention includes a method for identifying lost or stolen items which searches a sales activity database for at least one sales data record containing information relating to items sold or offered for sale on at least one Internet site. A loss database is also searched for at least one loss data record containing information relating to lost or stolen items, and the at least one sales data record and the at least one loss data record are compared to discover at least one matching item. If at least one matching item is discovered, a suspicious activity report is generated.

Another aspect of the present invention includes an activity monitoring station for tracking lost or stolen items in which the activity monitoring station is in communication with a sales activity database and a loss database. The activity monitoring station has a processor communicatively coupled to the communication interface. The processor is operable to search a sales activity database for at least one sales data record containing information for items sold or offered for sale on at least one Internet site and search a loss database for at least one loss data record containing information relating to lost or stolen items. The processor compares the at least one sales data record to the at least one loss data record to discover at least one matching item. If at least one matching item is discovered, the processor generates a suspicious activity report.

In accordance with another aspect of the present invention, a system for tracking lost or stolen items includes a sales activity database, a loss database, and an activity monitoring station communicatively coupled to the sales activity database and the loss database. The sales activity database contains information for items sold or offered for sale on at least one Internet site. The loss database stores information for lost or stolen items. The activity monitoring station searches the sales activity database for at least one sales data record and searches the loss database for at least one loss data record. The activity monitoring station compares the at least one sales data record to the at least one loss data record to discover at least one matching item. If the activity monitoring station discovers at least one matching item, it generates a suspicious activity report.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
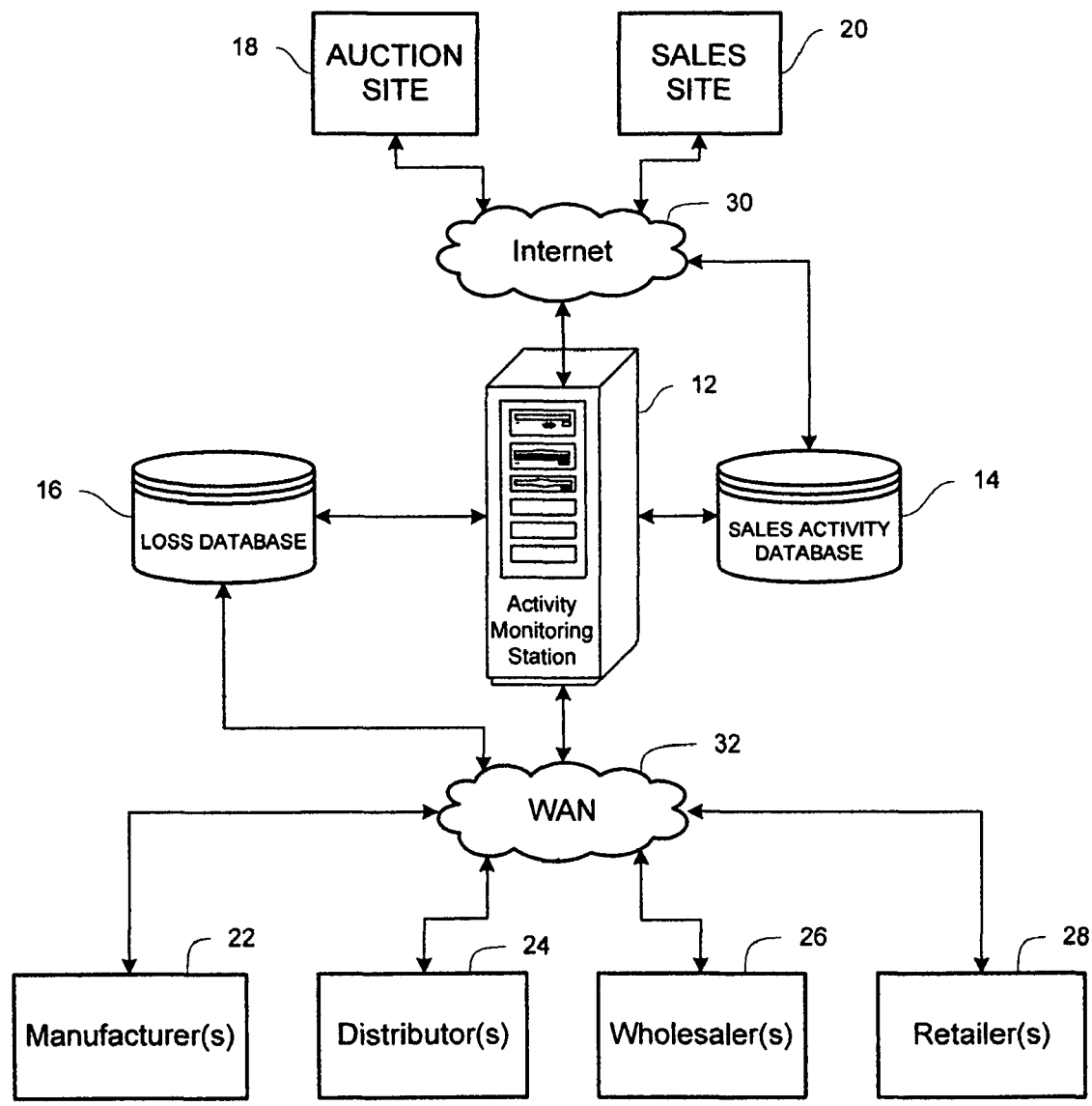
FIG. 1 is a block diagram of an exemplary loss/sales correlation system constructed in accordance with the principles of the present invention.

Before describing in detail exemplary embodiments that are in accordance with the present invention, it is noted that the embodiments reside primarily in combinations of apparatus components and processing steps related to implementing a system and method for correlating Internet sales and supply chain loss. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention includes a system and method to determine statistical correlation between known loss logs from various points in the merchandise supply chain recording lost or stolen merchandise, items suspected to be pirated or distributed through gray market sales, and items sold or offered for sale on Internet advertising and auction sites. The system of the present invention tracks patterns of theft and offers for sale on the Internet and correlates suspicious activity using cues such as geographic location of theft/sale, sale or offer for sale below typical market or wholesale price, quantity of items offered for sale similar to quantity stolen, date of offer for sale shortly after date stolen, etc. Other suspicious statistical properties may be considered as well, e.g., a new vendor offering a new item. In one embodiment, the system outputs a suspicious activity alert for loss prevention professionals and/or law enforcement personnel to help investigate and prosecute thieves and potentially recover losses.

Referring now to the drawing figures in which like reference designators refer to like elements, there is shown in FIG. 1, an exemplary loss/sales correlation system constructed in accordance with the principles of the present invention, and designated generally as "10." System 10 includes an activity monitoring station 12 which monitors a sales activity database 14 and a loss database 16 to correlate, track and report similarities between the two databases. Although shown separately, databases 14 and 16 may be incorporated into a single computing device. Alternatively, the sales activity database 14 and the loss database 16 may be co-located as part of the activity monitoring station 12. Databases 14 and 16 can be relational databases, flat files, or any other type of database.

The sales activity database 14 contains information concerning sales records from Internet auction sites 18 and sales sites 20 of prior and recent sales and offers for sale of items identified on a watched item list. The loss database 16 contains information concerning items reported as lost or stolen by participating members of a supply chain, e.g., manufacturers 22 (one shown), distributors 24 (one shown), wholesalers 26 (one shown), and retailers 28 (one shown). Participating members communicate with the loss database 16 through a wide-area network connection 30, which may be the Internet or a private intranet. Loss data may be logged locally at various points in the supply chain and used to update the loss database 16.

The activity monitoring station 12 may also be communicatively coupled to the Internet 30 and the wide-area network 32. The activity monitoring station 12 may actively monitor Internet auction sites 20 and on-line sales sites 22 and obtain information relating to current sales and offers for sale of items identified as lost or stolen. The activity monitoring station 12 may record recent sales activities of the monitored sites and store this information in the sales activity database 14. Alternatively, the activity monitoring station 12 may retrieve sales activity data already stored in the sales activity database 14 for comparison to data stored in the loss database 16.

Figure 2:
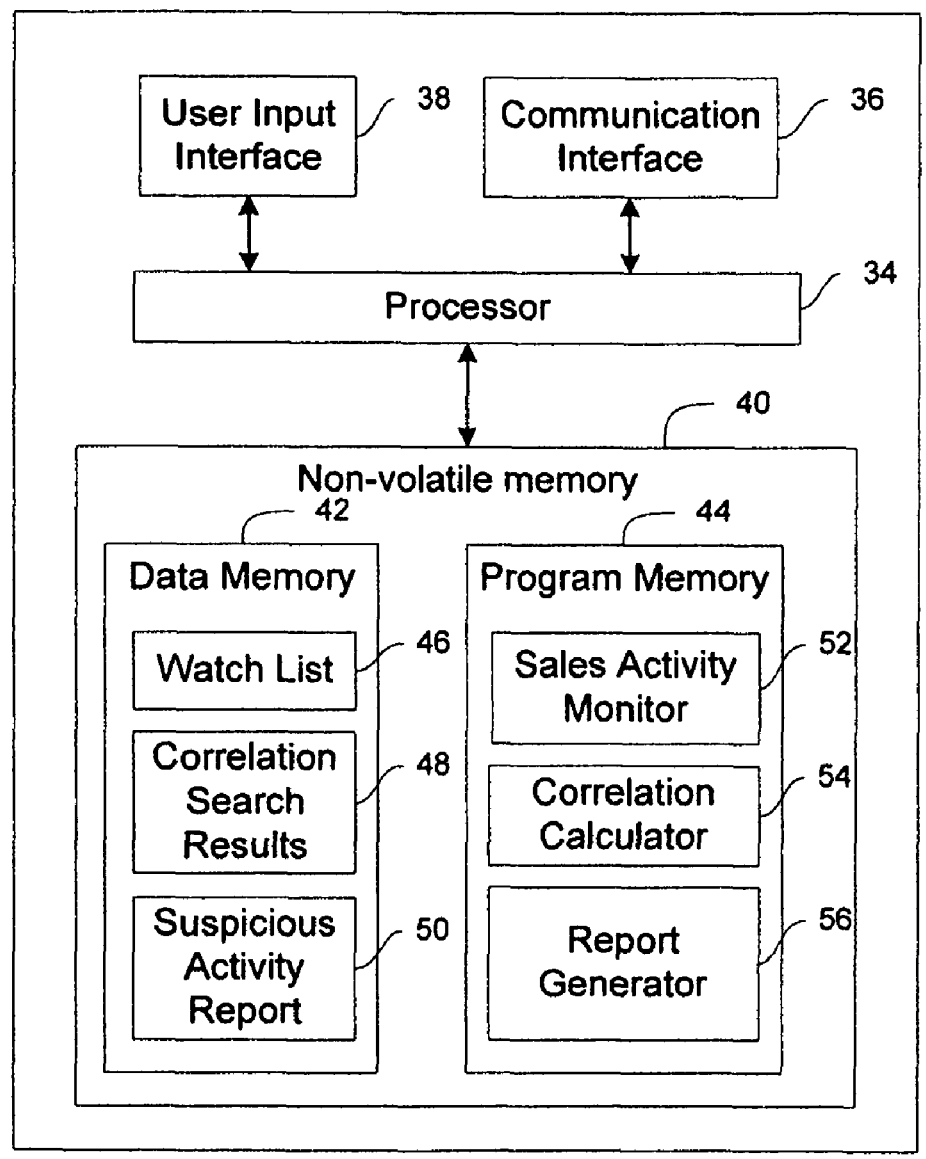
FIG. 2 is a block diagram of an exemplary activity monitoring station constructed in accordance with the principles of the present invention.

FIG. 2 depicts a block diagram of an exemplary activity monitoring station 12 constructed in accordance with the principles of the present invention. The exemplary activity monitoring station 12 may include a processor 34, which supervises and performs the various functions of the activity monitoring station 12 including those described herein. The processor 36 is communicatively coupled to at least one communication interface 36, a user input interface 38, and a non-volatile memory 40. The communication interface 36 controls the exchange of information between the activity monitoring station 12 and other devices via the Internet 30 the wide-area network 32, or other communication networks (not shown) in a well-known manner, such as via the Transmission Control Protocol/Internet Protocol ("TCP/IP"). The user input interface 38 receives information and control commands from a user through a variety of commonly known input devices, e.g., a mouse, a keyboard, a microphone, etc.

The non-volatile memory 40 may include a data memory 42 and a program memory 44. The data memory 42 may contain a watch list 46, correlation search results 48 and suspicious activity reports 50 (one shown). The watch list 46 may contain identifiers, e.g., network addresses, names, uniform resource locators ("URLs"), for known auction sites and other web based sales sites designated to be monitored. The watch list 46 may also include search terms that identify items for sale to enable searches on the Internet 32 for previously unknown, privately run websites offering items for sale. The watch list 46 may be created directly by a user, received from a third party, or generated by the activity monitoring station 16. The correlation search results 48 includes a listing of matching items from the sales activity database 14 and the loss database 16, as well as a computational correlation value representing the number of matching parameters for each item or group of items. A suspicious activity report 50 is generated and stored, at least on a temporary basis, each time the correlation value exceeds a predetermined threshold.

The program memory 44 may include a sales activity monitor 52, a correlation calculator 54, and a report generator 56. The sales activity monitor 52 retrieves data concerning sales records and offers for sale from Internet sites listed on the watch list 46 and stores the information in the sales activity database 14. The correlation calculator 54 performs correlation searches between the sales activity database 14 and the loss database 16 to find matching items and calculates a correlation value based on the number of similar parameters found for the matching items. The report generator 56 generates a suspicious activity report 50 whenever the matching items found are so similar that the correlation value determined for that item, or group of items, exceeds a predetermined threshold.

Figure 3:
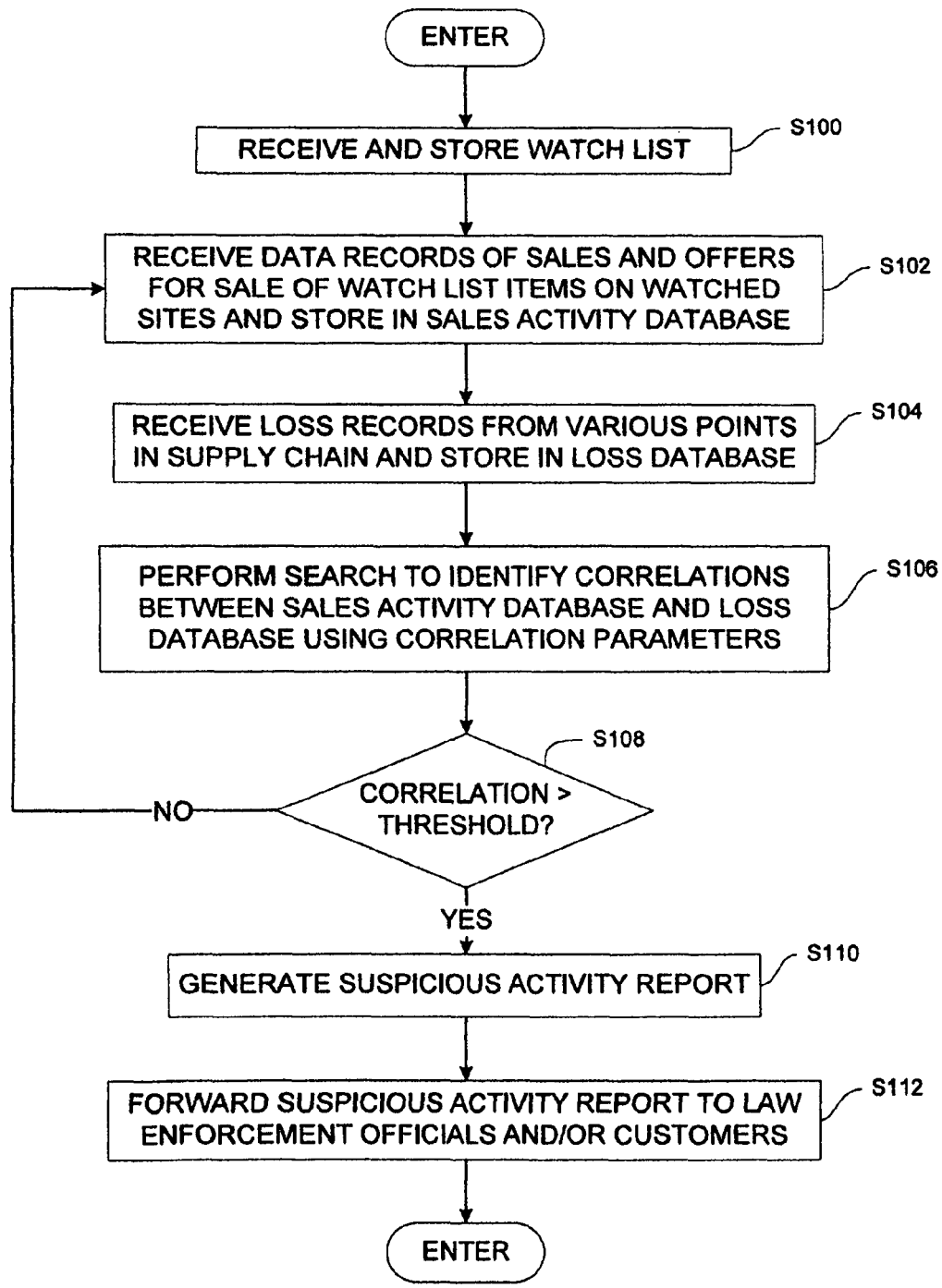
FIG. 3 is a flowchart of an exemplary loss/sales correlation process according to the principles of the present invention.

Referring to FIG. 3, a flowchart is provided that describes exemplary steps performed by an activity monitoring station 12 to track statistical correlation between known loss logs from various points in the merchandise supply chain and items sold or offered for sale on Internet advertising and auction sites. The activity monitoring station 12 receives and stores a list of watched items that will be monitored (step S100). The watch list may be created manually by a system administrator or automatically using an RFID equipped EAS system that detects which items have been stolen during "gate crashing" events, or a combination thereof. The watch list may contain known auction sites and other web based sales sites designated to be monitored, as well as search terms identifying items for sale to enable searches on the Internet 32 for previously unknown privately run websites offering items for sale. The activity monitoring station 12 then obtains data concerning sales and offers for sale of watch list items found on watch sites (step S102). This sales data is stored in the sales activity database 14.

Loss data from various points in the supply chain, e.g., manufacturers, wholesalers, distributors, retailers, etc., is received from individual local loss logs and stored in the loss database 16 (step S104). Loss data may be entered into the loss database 16 manually from each participating location, or may be obtained automatically from each site. For example, the system of the present invention may be combined with RFID systems to automatically log missing items. If an item bearing an active EAS tag and an RFID label is carried past an EAS detector and thereby triggers an alarm, RFID can be used to obtain information about the item, e.g., item type, model and serial number, specific features such as size and color, date and time of theft, location of store, etc., which is automatically logged in the loss database 16.

Additionally, the system of the present invention may also monitor grey market traffic on the Internet. For example, the loss database 16 may include items targeted for foreign sales. The activity monitoring station 12 may monitor the Internet for sales of items in the United States that originate overseas, are based on known grey markets, etc. Generally speaking, grey market items are items that are intended for sale in one country but diverted somewhere in the distribution channel and offered for sale in another. The monitoring of advertising and auction sites may also look for items offered for sale outside of traditional sales channels, quantities of items offered for sale that are in line with quantities diverted, or items that are below the price that is considered normal (e.g., Canadian pharmaceuticals for sale in the USA).

The activity monitoring station 12 performs correlation searches on a regular basis as new data is added to each database to identify correlations between the sales activity database 14 and the loss database 16 (step S106). Correlation parameters are used to search records of the loss database 16 and sales activity database 14 to discover matches between the two databases. These parameters may include, but are not limited to, geographic location of theft/sale, sale or offer for sale below typical market or wholesale price, quantity of items available for sale similar to quantity stolen, date of offer for sale similar to date stolen, longevity of auction vendor, etc. The correlation search outputs a numerical correlation value determined according to the number of matching correlation parameters found in both databases.

Generally, numerical values may be assigned to the degree of time correlation, the quantity correlation and geographic correlation. Together these values can individually or together be compared to a threshold or thresholds to trigger an alert. These thresholds can be adjusted to create more or less sensitivity of the system and, conversely, less or more false positive detections.

As an example of determining a correlation value, consider the case where a watch list 46 is setup to monitor "razors". The sales activity monitor 52 records new items of razors offered for sale at more than 2 standard deviations below the average price for other discount shopping sites. Sometime after the detection of this anomaly, the loss logs record that the brand of razor being offered for sale at the discounted rate were lost from the supply chain during a shipment 1 week prior to the appearance of the offer for sale. This is a correlation in time of loss and offer for sale and statistically low prices.

In another example, a watch list 46 is setup to monitor USB thumb drives. The sales activity monitor 52 records a popular auction site has a relatively new auction member offering lots of 20 USB thumb drives at a price less than wholesale price. A total of 23 auctions were recorded during a period of 3 weeks. The "ship from" location is in Arizona, USA. The loss logging system has recorded a theft of a two cases with a total of 500 units of that brand of USB drive from the warehouse of a retailer located in Phoenix, Ariz. sometime within the month prior to the beginning of the auction activity. This example has a correlation of quantity time and geographic location.

Predetermined detection criteria or thresholds are set for flagging suspicious activity. The detection criteria may be adjusted manually or automatically, as needed, to reduce the number of detections to a manageable amount, or flag more incidents if large numbers of stolen or lost items remain undiscovered. The activity monitoring station 12 compares the database correlation to the predetermined thresholds (step S108). As long as the correlation value is below the predetermined threshold, the activity monitoring station 16 returns to step S102 to continue to monitor the sales activity database 14 and the loss database 16. However, if the correlation value exceeds the predetermined threshold, the activity monitoring station 16 generates a suspicious activity report (step S110), which may be prioritized and reviewed if necessary. The suspicious activity report may include, but is not limited to: 1) information for each of the correlation items from the loss log the sales monitoring logs and the thresholds that triggered the correlation and/or 2) items from the sales monitoring information that may be unusual such as sales of an item more than, for example, 50% below average or a large lot of items. The activity monitoring station 16 then forwards the suspicious activity report to customers, law enforcement personnel, or other designated recipients for follow up (step S112). A system administrator can periodically review correlation statistics to ensure accuracy of detection.

The exemplary methods, system, and activity monitoring device of the present invention advantageously provide an automatic means to detect suspicious activity on auction sites and other Internet sales websites. Potential sales activity for lost or stolen items may be identified and the proper authorities alerted even though the sales occurred before the theft was discovered, the sales may be conducted anonymously and the purchasers are not local. Additionally, the automatic monitoring uses statistical methods to find patterns that may not be apparent due to large volume of theft and auctions.

The present invention advantageously provides a method to detect to sweet-hearting and to collect evidence of theft that may be used to build a case for future prosecution. The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for correlating known loss data with on-line sales offers to detect suspicious activity, the method comprising:
   providing a loss database including known loss data records;
   providing an item watch list based on the loss database;
   collecting sales activity data records based on offers to sell the items on the watch list to the public;
   storing the sales activity data records in a sales activity database;
   searching the loss database and the sales activity database to identify at least one loss data record and at least one sales data record relating to the same watched item;
   obtaining a first parameter associated with the at least one sales data record;
   obtaining a second parameter associated with the at least one loss data record;
   comparing the first parameter and the second parameter;
   calculating a correlation value based on the comparison of the first parameter and the second parameter;
   identifying an item match when the correlation value exceeds a predetermined threshold value; and
   responsive to discovering the at least one matching item, generating a suspicious activity report.

2. The method of claim 1, further comprising monitoring sales activities of at least one predetermined Internet site and storing corresponding sales activity information in the sales activity database.

3. The method of claim 2, further comprising searching the Internet for sales sites using at least one predetermined keyword to establish the at least one predetermined Internet site.

4. The method of claim 1 wherein the first parameter and the second parameter each comprise a plurality of predefined correlation parameters, and a predetermined threshold value is associated with each of the plurality of predefined correlation parameters.

5. The method of claim 4, wherein each threshold value associated with each of the plurality of predefined correlation parameters can be selectively and independently adjusted to provide the desired level of system sensitivity.

6. The method of claim 1, further comprising sending the suspicious activity report to at least one of a customer, a law enforcement official and a designated recipient.

7. The method of claim 1, wherein the loss database includes information from at least one vendor in a supply chain.

8. The method of claim 1, wherein the loss database includes information automatically entered from an RFID system in response to a triggered alarm.

9. An activity monitoring station for tracking lost or stolen items, the activity monitoring station being in communication with a sales activity database and a loss database, the activity monitoring station comprising:
   a data memory storing a list of Internet sites and an item watch list,
   a processor communicatively coupled to the data memory, the processor operable to:
   monitor sales activities of Internet sites designated in the listing of Internet sites for offers to sell items on the item watch list;
   store data relating to offers to sell items on the item watch list in the sales activity database;
   search the loss database and the sales activity database to identify at least one loss data record and at least one sales data record relating to the same item on the watch list;
   obtain a first parameter associated with the at least one sales data record;
   obtain a second parameter associated with the at least one loss data record;
   compare the first parameter and the second parameter;

calculate a correlation value based on the comparison of the first parameter and the second parameter;

identify an item match when the correlation value exceeds a predetermined threshold value; and responsive to discovering the at least one matching item, generate a suspicious activity report 10. The activity monitoring station of claim 9, wherein a correlation value is calculated for each of the plurality of predefined correlation parameters, and a predetermined threshold value is associated with each of the plurality of predefined correlation parameters.

11. The activity monitoring station of claim 10, wherein the processor is further operable to compare the sum of the correlation values calculated for each of the plurality of predefined correlation parameters as to a predetermined threshold.

12. The activity monitoring station of claim 10, wherein each predetermined threshold value can be selectively and independently adjusted to provide the desired level of system sensitivity.

13. A system for correlating known loss data with on-line selling activity to detect suspicious activity, the system comprising:

a sales activity database containing information for items sold or offered for sale on at least one Internet site;

a loss database storing information for lost or stolen items; and an activity monitoring station communicatively coupled to the sales activity database and the loss database, the activity monitoring station:

monitoring sales activities of Internet sites designated in the listing of Internet sites for offers to sell items on an item watch list;

storing data relating to offers to sell items on the item watch list in the sales activity database;

searching the loss database and the sales activity database to identify at least one loss data record and at least one sales data record relating to the same item on the watch list;

obtaining a first parameter associated with the at least one sales data record;

obtaining a second parameter associated with the at least one loss data record;

comparing the first parameter and the second parameter;

calculating a correlation value based on the comparison of the first parameter and the second parameter;

identifying an item match when the numerical value exceeds a predetermined threshold value; and responsive to discovering the at least one matching item, generating a suspicious activity report.

14. The system of claim 13, wherein the activity monitoring station further monitors sales activities of at least one predetermined Internet site and stores corresponding sales activity information in the sales activity database.

15. The system of claim 14, further comprising searching the Internet for sales sites using at least one predetermined keyword to establish the at least one predetermined Internet site.

16. The system of claim 13, wherein the activity monitoring station stores a watch item list containing terms that identify items that are at least one of sold and offered sale.

17. The system of claim 13, wherein the activity monitoring station further compares first parameter and the second parameter by:

finding at least one pair of matching parameters;

assigning a numerical value for each pair of matching parameters found; and calculating the correlation value for each matching item based on the numerical value of the pairs of matching parameters found.

18. The system of claim 13, wherein the activity monitoring station is further operable to send the suspicious activity report to at least one of a customer, a law enforcement official and a designated recipient.

19. The system of claim 13, wherein the loss database includes information from at least one vendor in a supply chain.

20. The system of claim 13, wherein the loss database includes information automatically entered from an RFID system in response to a triggered alarm.

21. The system of claim 13, wherein the first parameter and the second parameter each comprise a plurality of predefined correlation parameters.

22. The system of claim 21, wherein the plurality of correlation parameters include one or more of: geographic location of the item theft/loss, geographic location of the vendor, sales price, the date of loss, the date of the offer for sale, the quantity of items lost, the quantity of items available for sale, and vendor data.

23. The system of claim 21, wherein the correlation parameters are assigned numeric values.

* * * * *